May 22, 1928.
E. S. MacPHERSON
DAMPER
Filed Aug. 31, 1925
1,670,369
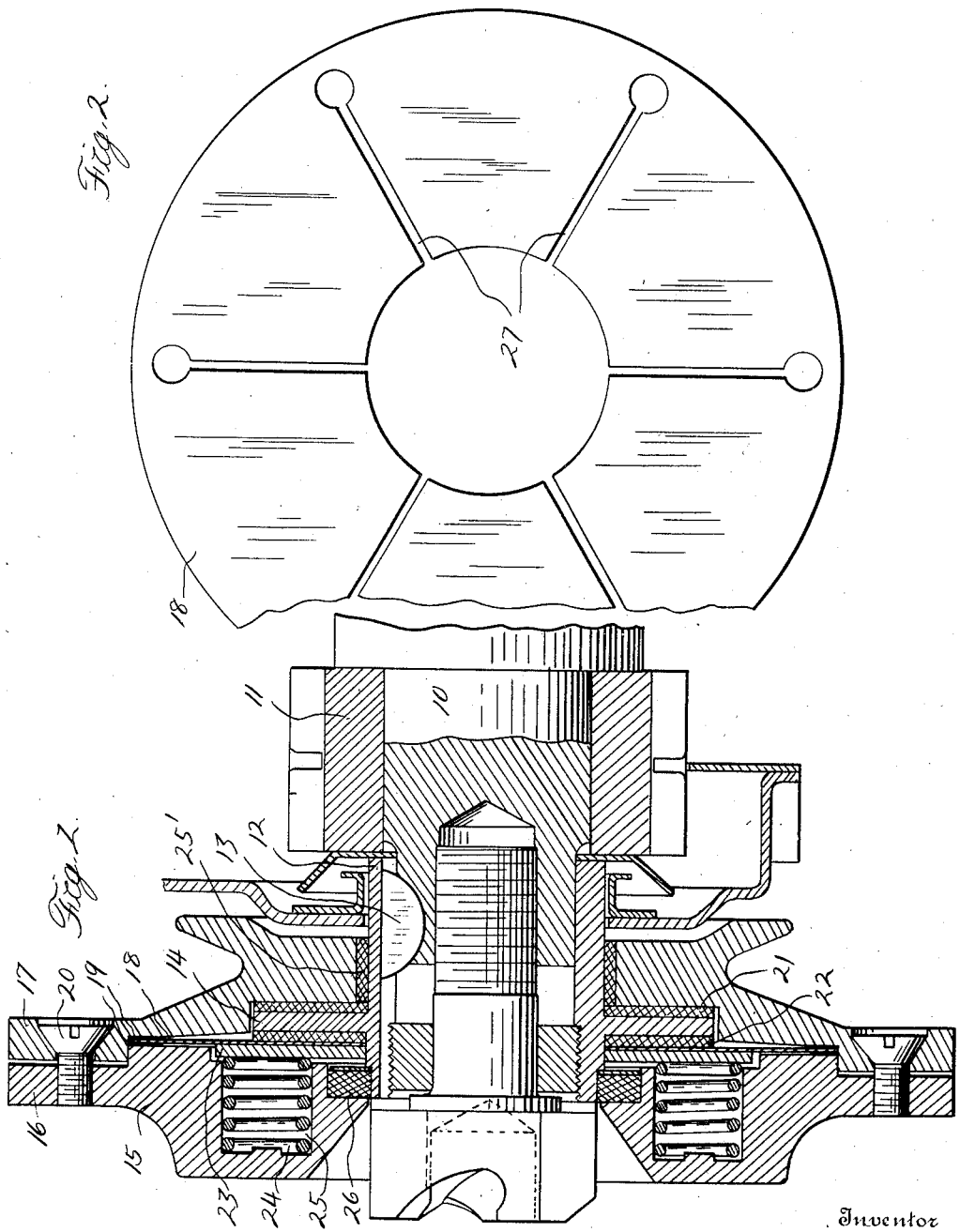
Inventor
Earle S. MacPherson
By Whittemore Hulbert Whittemore
+Belknap
Attorneys Patented May 22, 1928. 1,670,369

UNITED STATES PATENT OFFICE.

EARLE S. MacPHERSON, OF DETROIT, MICHIGAN, ASSIGNOR TO HUPP MOTOR CAR CORPORATION, OF DETROIT, MICHIGAN, A CORPORATION OF MICHIGAN.

DAMPER.

Application filed August 31, 1925. Serial No. 53,606.

The invention relates to motor vehicles and refers more particularly to means for dampening torsional vibration commonly experienced in the ordinary multi-cylinder crank shaft. The principle employed in my invention consists in applying to the ordinary crank shaft which is generally provided with a flywheel at one end, a second vibration dampening flywheel preferably of a smaller size and located preferably at the other end of the crank shaft. This second flywheel unlike the first or main flywheel, is not rotatable rigidly with the crank shaft but is centered free upon it and is driven from it by frictional clutch-like means. The amount of torque which this clutch will stand is adjusted so that there will be no slipping under ordinary conditions of operation. When, however, the speed of the crank shaft and the explosion impulses thereon are such that a torsional period of vibration would occur in the crank shaft the tendency toward several very rapid angular accelerations both positive and negative during the revolution of the crank shaft causes an additional momentary torque which in turn causes the clutch to slip. The energy which is in this manner absorbed by the clutch friction surfaces, would, if the clutch driven flywheel were not present, build up the torsional vibrations of the crank shaft to an objectionable extent.

It has been the practice in devices of this character heretofore used to provide a vibration damping flywheel formed of two members, one driven from the other, one of which members is formed of two parts yieldably exerting a frictional effort on the other member. In order for the frictional characteristics of the damper to remain the same under all conditions, these two parts must move together rotationally although provision is made for permitting their relative axial movement for exerting the aforesaid frictional pressure on the other member. To provide this movement the two parts are generally dowelled or interlocked at a plurality of circumferentially spaced points.

In the first instance (where dowels are employed) a certain amount of clearance must be used in order that the dowels do not stick and prevent the relative axial movement of the dowelled parts. This clearance tends to cause rattle of the parts when one part slips ahead of the other. Also, within the limits of the clearance one part may slip independently of the other and within these limits the damper characteristic is consequently not what it should be. I have further found that within the limits of clearance allowed there is frequently a vibration period of the crank shaft corresponding thereto which whenever the speed of the engine corresponds to this period, will set up objectionable vibrations in crank shaft. Furthermore, the dowels are subject to constant wear which increases the clearance and further emphasizes the objectionable results.

In the second instance (where the two parts of one of the damper flywheel members are interlocked) the above noted disadvantages are also encountered. The interlocking of the parts requires accurate and careful machining which makes the production expensive. As a consequence of the difficult machining the interlocked parts frequently rattle giving rise to objectionable noises and vibrations.

With these and other objects in view the invention resides in the novel features of construction and combinations and arrangements of parts as more fully hereinafter described and claimed.

Referring to the drawings, in which like reference characters indicate corresponding parts, Figure 1 is a sectional elevational view of my damper, and Figure 2 is a detail side elevational view of the pressure plate.

Referring to the drawings, reference character 10 indicates one end of an ordinary multi-cylinder crank shaft, 11 being a gear wheel keyed to the shaft for driving a chain or the like for operating the usual cam shaft or other parts of the motor. 12 is a hub or driving member keyed at 13 to the crank shaft 10. This hub is preferably formed with the driving flange 14. 15 is the driven member of the damper flywheel, this member being preferably formed of the two parts 16 and 17. 18 is a relatively thin driven disk which is positioned between the parts 16 and 17 of the driven flywheel member 15. 19 is a gasket which may be located between part 17 and the disk 18. For clamping together the parts 16 and 17 with the disk 18 between these parts, I have provided clamping screws 20 which may be engageable with the parts 16 and 17 at a plurality of circumferentially arranged points. Between the driving flange 14 and the part 17 is an annular friction material 21. Likewise between the flange 14 and the inner peripheral surface of the disk 18 is located the friction material 22. 23 is a pressure distributing plate adapted to bear upon the opposite face of the disk 18. For exerting a yielding pressure against this plate, I have provided at a plurality of circumferentially spaced points, the springs 24 which are housed in the pockets 25 formed in the part 16 of the flywheel driven member 15. 25′ and 26 are sealing strips preventing the entry of water, mud and other foreign material into the housing formed by the flywheel parts.

Referring to Figure 2, I have shown in detail a preferred type of driving disk. This disk is preferably of a relatively thin flexible character and for increasing the flexible nature of this disk the latter is preferably provided with the radial slots 27.

In operation, the flywheel member 15 is normally driven from the driving member 12 through the friction established by the pressure of springs 24 against the pressure distributing plate 23, disk 18 and the friction material 21 and 22. When, however, the speed of the crank shaft and the explosion impulses thereon are such that a torsional period of vibration would occur in the crank shaft, the tendency toward rapid angular accelerations produces a slipping at the points of frictional contact.

While it is believed that from the foregoing description the nature and advantages of my invention will be readily understood, I desire to have it understood that I do not limit myself to what is herein shown and described and that such changes may be resorted to when desired as fall within the scope of the claims.

What I claim as my invention is:

1. A vibration damping flywheel adapted for use in damping torsional vibrations of a motor vehicle crank shaft, said flywheel comprising a driving member fixed to rotate with the crank shaft and a driven member, the driven member being formed in two parts, and a yielding driving connection between said members, said connection including a relatively thin disk fixed to one of said members and means for urging said disk into frictional engagement with the other.

2. A vibration damping flywheel adapted for use in damping torsional vibrations of a motor vehicle crank shaft, said flywheel comprising a driving member fixed to rotate with the crank shaft and a driven member, one of said flywheel members being formed in two parts, a flexible disk, means for connecting said two parts and said disk together preventing their relative movement, said flexible disk having a portion frictionally engaging the other of said flywheel members and a spring exerting a pressure on said disk tending to produce said frictional engagement.

3. A vibration damping flywheel adapted for use in damping torsional vibrations of a motor vehicle crank shaft, said flywheel comprising a driving member fixed to rotate with the crank shaft and a driven member, said driving member formed with a driving flange, said driven member being formed in two parts, a flexible disk, means for clamping together the said two parts and the flexible disk, friction material between the driven member and driving flange and frictional material between the flexible disk and driving flange, a pressure plate adjacent said flexible disk and yielding means exerting a pressure against said pressure plate.

4. A vibration damping flywheel adapted for use in damping torsional vibrations of a motor vehicle crank shaft, said flywheel comprising a driving member fixed to rotate with the crank shaft and a driven member, the driven member being formed in two parts, means for connecting the two parts together preventing their relative movement, a flexible disk clamped between the two parts of the driven member and rotatable therewith, the said flexible disk having a portion frictionally engaging the driving member, and means carried by the driven member tending to produce said frictional engagement.

5. A vibration damping flywheel comprising a driven member formed in two parts, a flexible disk carried by the driven member and rotatable therewith, a driving member housed within the driven member and frictionally engageable with the said flexible disk, and a plurality of springs carried by the driven member and exerting a pressure on said disk tending to increase the frictional engagement between the flexible disk and the driving member.

6. The combination in a vibration damping flywheel, of a driven member forming a housing, a driving member within said housing, a flexible disk frictionally engaging the driving member, a pressure plate, and a plurality of springs carried by the driven member for forcing the pressure plate against the flexible disk.

7. A vibration damping flywheel adapted for use in damping torsional vibrations of a motor vehicle crank shaft, said flywheel comprising a driving member fixed to rotate with the crank shaft, a driven member formed in sections, a flexible disk, means for clamping together said sections and the flexible disk, and means establishing a yielding driving connection between said disk and said driving member.

In testimony whereof I affix my signature.

EARLE S. MacPHERSON.